March 19, 1968  C. M. HAWKINS  3,373,852

SAFETY COUPLING

Filed May 20, 1965

INVENTOR.
Cyril M. Hawkins
BY
Paul Fitzpatrick
ATTORNEY

United States Patent Office 3,373,852
Patented Mar. 19, 1968

3,373,852
SAFETY COUPLING
Cyril M. Hawkins, Indianapolis, Ind., assignor to General Motors Corporation, Detroit, Mich., a corporation of Delaware
Filed May 20, 1965, Ser. No. 457,304
5 Claims. (Cl. 192—48)

ABSTRACT OF THE DISCLOSURE

A safety coupling which transmits an unlimited amount of torque in one direction through an intermediate member movably splined on one shaft and spring urged into positive engagement with a second shaft. The safety coupling will transmit a limited amount of torque in the opposite direction by virtue of the spring. A friction clutch couples the intermediate member to the second shaft to hold the positive clutch out of ratcheting engagement beyond the negative torque limit.

My invention relates to safety couplings, by which I mean a type of device which couples an engine to a load for transmission of unlimited torque in one direction and for transmission of substantial but definitely limited torque in the other direction. Such safety couplings find use in gas turbine propeller powerplants for aircraft in which, if the engine fails, it is necessary to decouple the propeller from the engine to prevent heavy braking forces on the aircraft. However, it is desirable to have the propeller windmill and drive the engine so long as the load is not unduly great, as, for example, to crank and restart the engine or to use the engine-propeller combination to provide drag on the aircraft during landing or diving maneuvers.

The purpose of my invention, therefore, is to provide a mechanism which will transmit unlimited torque (within the capacity of the power plant) in one direction and limited torque, sufficient to provide desired control of an aircraft or to start the power plant, in the other direction, but which will uncouple upon transmission of reverse torque of an undesirably high level. A further object is to provide such a coupling that is not damaged or hazarded by the overrunning action, and which will reengage smoothly after disengagement if the direction of torque again becomes normal. It is a further object to provide such a mechanism which is light in weight and compact and well suited to the requirements of aircraft installations. However, while the invention has been conceived in response to the needs of aircraft installations, it is capable of use in other situations.

The nature of the present invention and the advantages of it will be apparent from the succeeding description of the preferred embodiment and the accompanying drawings.

Figure 1:
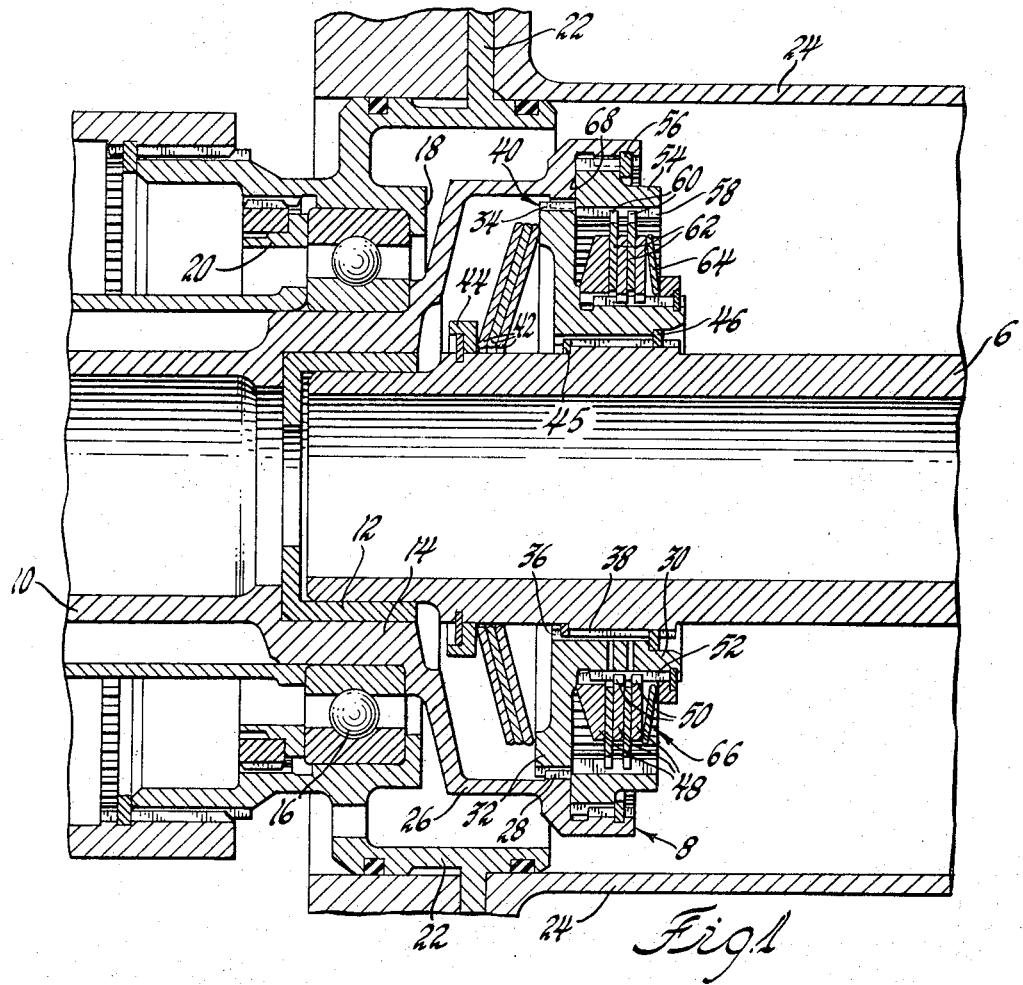
FIGURE 1 is a longitudinal sectional view taken on a plane containing the axis of the coupling, showing the clutch in the engaged condition.

Referring first to FIGURE 1, this illustrates an engine-driven shaft 6 which feeds power to a safety coupling 8. The safety coupling 8 drives a second shaft 10 which, in turn, drives a propeller (not illustrated).

Figure 2:
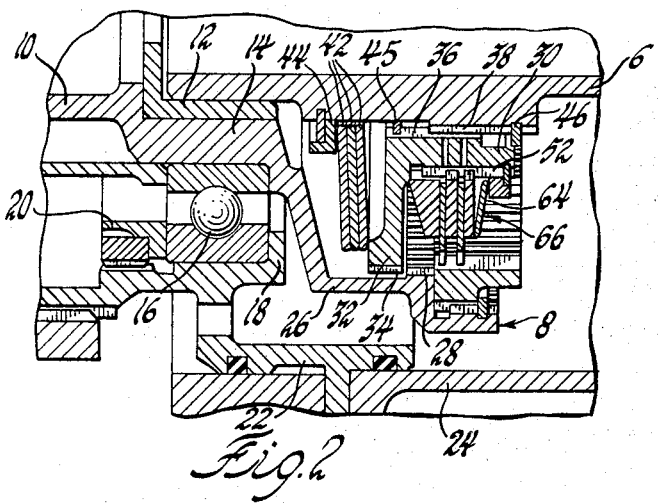
FIGURE 2 is a partial view similar to FIGURE 1, showing the clutch in the disengaged condition.

The first, input, or driving shaft 6 is shown at the right and the second, output, or driven shaft 10 is shown at the left. The first shaft 6 is maintained in axial and radial alignment with the second shaft 10 by a plain bearing 12 mounted between the shaft 6 and the enlarged rearward portion 14 of the second shaft. The enlarged portion 14, in turn, is rotatably mounted in a ball bearing 16 which is between an annular flange 18 and a locking ring 20 on a support collar 22 carried by a housing 24. The second shaft 10 has also integral with it an enlarged cup-like portion 26 having helical internal splines 28. An intermediate member 30 of generally cylindrical configuration includes a radial flange 32 having a rim provided with helical splines 34 which mesh with the splines 28 on the second or driven member 10. The intermediate member 30 also bears helical internal splines 36 on its inner circumferential surface which mesh with helical external splines 38 on the periphery of the first or driving shaft 6, thereby movably mounting the member 30 on the driving shaft 6. Splines 28, 34, 36, and 38 all have the same lead, with splines 28 and 34 constituting a positive or dog clutch 40 and being of opposite hand than the splines 36, 38. The dog clutch splines 28 and 34 have beveled radial faces (not shown) to facilitate reengagement. The helix angle of the splines 36, 38 is such that torque in the normal direction, that is, in the direction in which the engine drives the propeller, urges the intermediate member 30 to the right as shown in the drawings and thereby urges the dog clutch 40 into engagement. A set of nested Belleville springs 42 encircles the driving shaft 6 which the inner circumferential edge of the leftmost spring abutting a stop collar 44 carried by the shaft 6. The outer circumferential edge of the rightmost spring contacts the intermediate member 30 so that the springs 42 urge intermediate member 30 to the right (into engagement) and resist movement to the left. Snap rings 45 and 46 carried by intermediate member 30 and shaft 6, respectively, serve as stops to limit the movement of intermediate member 30 toward the right. In other words, the intermediate member 30 will be urged toward the right against stops 45 and 46 and clutch 40 will remain in engagement with a normal direction of torque but, if torque between the engine and propeller reverses, the reverse torque urges the intermediate member 30 to the left against the action of the Belleville springs 42 to disengage the dog clutch 40. The length of splines 38 on the driving member 6 is such that the dog clutch 40 may disengage, as shown in FIGURE 2, while the splines 36, 38 remain in engagement.

Thus, the intermediate member 30 remains rotatively coupled to the driving shaft 6. A set of clutch plates 48 have internal splines 50 by which they are axially slidably mounted on the external axial splines 52 on the outer surface of the cylindrical portion of the intermediate member 30. The second or driven shaft 10 has a ring 54 splined to it and retained by a snap ring 56. The ring 54 has internal high back lash splines 58 which slidably receive the mating external splines 60 of a second set of clutch plates 62. The clutch plates 48 are biased into engagement with clutch plates 62 to a predetermined degree by a single Belleville spring 64 thereby providing a friction clutch 66 between shafts 6 and 10 when the dog clutch 40 is disengaged.

*Operation*

If the drive is operating in the normal fashion and, for example, the engine fails and the propeller continues to rotate under the action of the apparent wind, the torque will reverse, and the reverse torque acting upon the splines 36, 38 will urge the intermediate member 30 to the left against the action of the Belleville springs 42. The shaft 10 will drive the shaft 6 up to the limit determined by the Belleville springs 42 and thus, the clutch will transmit torque from the propeller to the engine to brake the aircraft, or to start the engine, up to the limit preset by the spring force characteristic of Belleville springs 42. When this reverse torque limit is exceeded, the axial force created through the splines 28, 34 overcomes the Belleville spring force and the intermediate member 30 moves in splines 38 to a position where the splines 28 would ratchet in splines 34 and disengage clutch 40 but without disengaging the connection between the intermediate member 30 and the driving shaft 6. Ratcheting is caused by a residual force in the Belleville springs; that is, the Belleville springs are not quite radial when the dog clutch 40 is initially disengaged so that a slight clutch reengaging force remains. This force will cause a slight engagement of the beveled faces of splines 28, 34 of the dog clutch. The slight engagement, in turn, produces a disengagement force which moves the intermediate member 30 a slight amount to the left. This disengages the dog clutch. The dog clutch being disengaged, the residual force in the Belleville springs again causes a slight engagement and so on with the result being a ratcheting engagement between the intermediate member 30 and the driven shaft 10. The intermediate member 30, however, remains rotatively coupled to the normally driving shaft 6 through the helical splines 36, 38 and to the propeller shaft 10 through the friction clutch 66 comprising plates 48 and 62 biased into engagement by spring 64. The reverse torque drive through the lightly loaded friction clutch 66 causes the intermediate member 30 to move further to the left because of the reverse torque effect on helical splines 36, 38 connecting the intermediate member 30 to the shaft 6. This further movement eliminates the ratcheting engagement and its harmful effects. Beyond the force necessary for this additional leftward movement, the plates of clutch 66 slip because of the light loading of springs 64.

Now, assuming the clutch is disengaged and moved out of ratcheting engagement as shown in FIGURE 2, and the engine is started, or the power of the engine increases, or the power input from the propeller decreases so that the reverse torque diminishes, the members 30 and 10 are first coupled together for concurrent rotation through the friction clutch plates 48 and 62 which tends to synchronize the shafts 6 and 10. As the speed of shaft 6 becomes the same as that of shaft 10, the negative torque force acting through clutch 66 and splines 36, 38 disappears, and the residual Belleville spring force moves member 30 slightly to the right. As member 30 moves toward the right, the clutch 66 must also move axially. For this reason, the splines 58 and 60 between the clutch plates 62 and ring 54 are high back lash splines so that the friction clutch plates 62 will move axially with respect to the driven shaft 10 so as to offer the least possible resistance to the rightward movement of member 30. Another advantage of the use of high back lash splines at this point becomes especially evident during dog clutch reengagement. Recall that positive torque moves member 30 toward the right while negative torque moves it toward the left. During reengagement member 30 is being urged toward the right by the Belleville spring force. If there were a positive torque prior to engagement of the positive clutch 40, an axial spline force would be created through the friction clutch 66 aiding the Belleville spring force. The combination of the two would produce impact loads which would be disastrous should the dog splines 28 and 34 be out of alignment. The high back lash splines 58, 60 between the driven shaft 10 and the clutch plates 62 cause the clutch plates 62 to move toward the right in response to positive torque to unload the friction clutch 66 and thus eliminate this danger. In effect, member 30 is subjected to axial spline forces created through the friction clutch 66 only in the leftward or disengaging direction. In other words, the helical splines 36, 38 when acting through the friction clutch 66 is operative to move the member 30 out of engagement in response to negative torque but inoperative to move the member 30 into engagement in response to positive torque. Thus, the main Belleville springs 42 provide the sole reengaging force until the dog or positive clutch 40 is engaged to create an axial spline force. As the member 30 moves to the right, the deflection of Belleville spring is decreased so that the clutch reengaging force is increased and the member 30 is moved further to the right to start the engagement of the splines 28, 34 of the positive dog clutch 40. By this time, the speed of shaft 6 has usually overtaken that of shaft 10 to transmit positive torque. When the engagement of splines 28 and 34 has started, intermediate member 30 is urged to the right by both the Belleville springs 42, the splines 36, 38, and the positive clutch splines themselves which have a helix angle which urges the member 30 to the right in response to positive torque. The increase of torque as the engine power increases drives the helical dog clutch 40 into full engagement where the forward end of the intermediate member 30 engages the end wall 68 on the ring member 54 which is fixedly splined to the driven member 10. The member 30 in moving toward the right to fully engage the positive dog clutch 40 also rotates with respect to the driving shaft 6 and the driven shaft 10 because of the helical spline connections between the parts. In so doing, the clutch plates 62 would normally have to rotate with respect to the clutch plates 48. In such a case, the friction clutch torque would have to be overcome by the reengaging force. However, since the clutch plates 62 are connected to ring 54 through high back lash splines 58, 60, this clutch drag is removed during reengagement which is a third advantage of the high back lash splines.

The advantages of my present safety coupling will be apparent. It transmits unlimited torque in one direction, and relatively precisely limited torque in the reverse direction. Overrunning of the propeller above the reverse torque limit set by the Belleville spring disengages the positive dog clutch and a multiple-plate friction clutch moves the positive clutch to a position where the ratcheting or other destructive action between the elements of the positive clutch is eliminated. The multiple-plate friction clutch is unidirectional, that is, aids in disengagement but does not resist engagement.

It will be apparent that many modifications of structure may be made by the exercise of skill in the art without departing from the principles of my invention.

I claim:

1. A safety coupling for transmitting unlimited positive torque from a driving shaft to a driven shaft and limited negative torque from the driven shaft to the driving shaft, comprising:
   a driving shaft,
   a driven shaft,
   an intermediate member movable on one of said shafts between a first and a second position,
   positive clutch means on said intermediate member which engages said other shaft when said intermediate member is in said first position, spline means responsive to positive torque to move said intermediate member to said first position and responsive to negative torque to move said intermediate member to said second position where said positive clutch means is disengaged from said other shaft, spring means resisting movement of said intermediate member from said first position to establish the limited negative torque transmission from said driven shaft to said driving shaft, said spring means having a residual positive clutch engaging force remaining after said intermediate member has been moved to said second position causing ratcheting engagement of said positive clutch means, a first set of friction clutch plates carried by said intermediate member, a second set of friction clutch plates carried by said other shaft, and second spring means biasing said first and second set of clutch plates into engagement whereby said negative torque produces a force through said friction clutch to overcome said residual force to eliminate said ratcheting engagement.

2. A safety coupling for transmitting unlimited positive torque from a driving shaft to a driven shaft and limited negative torque from the driven shaft to the driving shaft, comprising:

a driving shaft,
a driven shaft,
helical dog splines on one of said shafts,
an intermediate member helically splined to the other of said shafts for movement between a first and a second position,
helical dog splines on said intermediate member which adapted to engage the helical dog splines on said one shaft when said intermediate member is in said first position, said helical splines and helical dog splines being responsive to positive torque to move said intermediate member to said first position and responsive to negative torque to move said intermediate member to said second position where said helical dog splines are disengaged,
spring means urging said intermediate member to said first position to establish the limited negative torque transmission from said driven shaft to said driving shaft, said spring means having a residual force remaining after said intermediate member has been moved to said second position causing a ratcheting engagement of said positive clutch means,
a first set of clutch plates carried by said intermediate member,
a second set of clutch plates carried by said one shaft, and
second spring means biasing said friction clutch into engagement whereby said negative torque produces a force through said friction clutch to overcome said residual force to eliminate said ratcheting engagement.

3. A safety coupling for transmitting unlimited positive torque from a driving shaft to a driven shaft and limited negative torque from the driven shaft to the driving shaft, comprising:

a driving shaft,
a driven shaft having helical dog splines,
an intermediate member helically splined to said driving shaft for movement between a first and a second position,
helical dog splines on said intermediate member which engages said helical dog splines on said driven shaft when said intermediate member is in said first position to couple said shafts, said helical splines and helical dog splines having the same lead and having a helix angle which causes said intermediate member to move to said first position in response to positive torque to move in response to negative torque to said second position, spring means urging said intermediate member to said first position thereby establishing the limited negative torque transmission from said driven shaft to said driving shaft, said spring means having a residual force remaining after said intermediate member has been moved to said second position tending to move said intermediate member toward said first position and into ratcheting engagement with said driven shaft, a first set of friction clutch plates carried by said intermediate member, a second set of clutch plates carried by said driven shaft, and second spring means biasing said friction clutch into engagement whereby said negative torque produces a force through said friction clutch, said force overrunning said residual force to retain said intermediate member in said second position out of ratcheting engagement with said driven member.

4. A safety coupling for transmitting unlimited positive torque from a driving shaft to a driven shaft and limited negative torque from the driven shaft to the driving shaft, comprising:

a driving shaft,
a driven shaft,
an intermediate member movable on one of said shafts between a first and a second position,
positive clutch means on said intermediate member which engages said other shaft when said intermediate member is in said first position,
spline means responsive to positive torque to move said intermediate member to said first position and responsive to negative torque to move said intermediate member to said second position where said positive clutch means is disengaged from said other shaft,
spring means resisting movement of said intermediate member from said first position to establish the limited negative torque transmission from said driven shaft to said driving shaft, said spring means having a residual positive clutch engaging force remaining after said intermediate member has been moved to said second position causing ratcheting engagement of said intermediate member with said other shaft, and
torque responsive friction clutch means engageable in response to negative torque to resist said residual force and to move said intermediate member out of ratcheting engagement and disengageable in response to positive torque.

5. A safety coupling for transmitting unlimited positive torque from a driving shaft to a driven shaft and limited negative torque from the driven shaft to the driving shaft, comprising:

a driving shaft,
a driven shaft,
helical dog splines on one of said shafts,
an intermediate member helically splined to the other of said shafts for movement between first and second axially spaced positions,
helical dog splines on said intermediate member which adapted to engage the helical dog splines on said one shaft when said intermediate member is in said first position, said helical splines and helical dog splines creating an axial engaging force responsive to positive torque to move said intermediate member to said first position and creating an opposite axial force responsive to negative torque to move said intermediate member to said second position where said helical dog splines are disengaged,
spring means creating an axial engaging force urging said intermediate member to said first position to establish the limited negative torque transmission from said driven shaft to said driving shaft, said spring means having an axial residual force remaining after said intermediate member has been moved to said second position causing a ratcheting engagement of said positive clutch means, a first set of clutch plates carried by said intermediate member, a second set of clutch plates carried by said one shaft through high back lash splines, and second spring means biasing said friction clutch plates into engagement whereby said negative torque produces an opposite axial force through said friction clutch to overcome said residual force to eliminate said ratcheting engagement and said positive torque disengages said friction clutch plates.

References Cited

UNITED STATES PATENTS

| | | | |
|---|---|---|---|
| 2,676,496 | 4/1954 | Gilbert | 192—46 |
| 3,161,270 | 12/1964 | Aschauer | 192—53.2 |
| 3,225,876 | 12/1965 | Dison | 192—46 |
| 3,249,187 | 5/1966 | McDowell | 192—48 |

FRED C. MATTERN, Jr, *Primary Examiner.*

DAVID J. WILLIAMOWSKY, *Examiner.*

C. J. HUSAR, *Assistant Examiner.*